US008831829B2

(12) United States Patent
Freienstein et al.

(10) Patent No.: US 8,831,829 B2
(45) Date of Patent: Sep. 9, 2014

(54) METHOD FOR SELECTING SAFETY MEASURES TO BE TAKEN TO INCREASE THE SAFETY OF VEHICLE OCCUPANTS

(75) Inventors: Heiko Freienstein, Weil Der Stadt (DE); Matthias Marcus Wellhoefer, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 207 days.

(21) Appl. No.: 12/998,266

(22) PCT Filed: Aug. 26, 2009

(86) PCT No.: PCT/EP2009/061012
§ 371 (c)(1),
(2), (4) Date: Jun. 30, 2011

(87) PCT Pub. No.: WO2010/037600
PCT Pub. Date: Apr. 8, 2010

(65) Prior Publication Data
US 2011/0178682 A1 Jul. 21, 2011

(30) Foreign Application Priority Data
Oct. 1, 2008 (DE) .................. 10 2008 042 518

(51) Int. Cl.
*B60R 21/01* (2006.01)
(52) U.S. Cl.
USPC .............. 701/41; 340/901; 342/455; 701/301

(58) Field of Classification Search
USPC .......... 701/45, 301, 27, 469, 98, 29.1, 47, 93, 701/532, 303; 340/903, 435, 436, 438, 901; 342/455; 382/103; 180/170, 179
See application file for complete search history.

(56) References Cited

U.S. PATENT DOCUMENTS

| 5,725,425 | A | * | 3/1998 | Rump et al. ............... 454/75 |
| 5,915,663 | A | * | 6/1999 | Lee ............................ 248/568 |
| 6,608,559 | B1 | | 8/2003 | Lemelson et al. |
| 7,647,178 | B2 | * | 1/2010 | Ekmark et al. ............ 701/301 |
| 7,702,425 | B2 | * | 4/2010 | Hougen ....................... 701/1 |
| 2001/0015548 | A1 | * | 8/2001 | Breed et al. ............... 280/735 |
| 2002/0022927 | A1 | | 2/2002 | Lemelson et al. |
| 2005/0275242 | A1 | * | 12/2005 | McNamee ............ 296/136.01 |
| 2007/0268155 | A1 | * | 11/2007 | Holmes et al. ............ 340/901 |
| 2010/0057305 | A1 | * | 3/2010 | Breed ......................... 701/47 |
| 2010/0169013 | A1 | * | 7/2010 | Nakamura et al. ........ 701/213 |
| 2010/0332266 | A1 | * | 12/2010 | Tamir et al. ................. 705/4 |

FOREIGN PATENT DOCUMENTS

| CN | 1723481 | 1/2006 |
| CN | 1862620 | 11/2006 |
| CN | 1924949 | 3/2007 |
| CN | 2904145 | 5/2007 |
| CN | 101105690 | 1/2008 |
| CN | 101357622 | 2/2009 |
| DE | 103 28 256 | 2/2005 |

(Continued)

*Primary Examiner* — Marthe Marc-Coleman
(74) *Attorney, Agent, or Firm* — Kenyon & Kenyon LLP

(57) ABSTRACT

In a method for selecting safety measures to be taken to increase the safety of occupants of a vehicle, which safety measures relate to a hazard due to environmental influences, a relevance of the hazard is inferred from received position data and warning message data, and at least one safety measure, which includes activation of an actuator in a vehicle, is selected and taken as a function of the relevance.

13 Claims, 3 Drawing Sheets

(56) References Cited

FOREIGN PATENT DOCUMENTS

| | | |
|---|---|---|
| DE | 10 2005 007 466 | 8/2006 |
| DE | 10 2008 039 472 | 2/2010 |
| EP | 1 897 774 | 3/2008 |
| JP | 5-325098 | 12/1993 |
| JP | 2007-38954 | 2/2007 |
| JP | 2007-206915 | 8/2007 |
| JP | 2007-316922 | 12/2007 |
| JP | 2008-64613 | 3/2008 |
| JP | 2008-146168 | 6/2008 |
| WO | WO 00/54008 | 9/2000 |
| WO | WO 2005/020182 | 3/2005 |

* cited by examiner

METHOD FOR SELECTING SAFETY MEASURES TO BE TAKEN TO INCREASE THE SAFETY OF VEHICLE OCCUPANTS

BACKGROUND OF THE INVENTION

1. Field of the Invention

The present invention relates to a method and a control unit for selecting vehicle occupant safety measures.

2. Description of Related Art

An emergency call and warning system is known from published German patent application document DE 10 2005 007466 A1, in which warning messages in the form of text information are transmitted together with position data to a vehicle via a satellite system. It is known that additionally transmitted data include details about a local relevance of the text information. The text information is output in a vehicle as a function of the position data as well as the local relevance.

BRIEF SUMMARY OF THE INVENTION

The method according to the present invention has the advantage over the related art that safety measures to be taken to increase the safety of occupants of a vehicle with regard to a hazard due to environmental influences are selected and taken as a function of a relevance of a hazard for the vehicle, one safety measure including activation of an actuator in the vehicle. This is advantageous, since not only are safety measures taken thereby in which a driver is provided with information on ways to implement a safety measure, but actuators are automatically activated. The relevance of the hazard is determined on the basis of received position data of the vehicle as well as on the basis of received warning message data.

According to one further specific embodiment of the present invention, the relevance of the hazard is inferred from sensor data provided by at least one sensor unit of the vehicle in addition to the position data and the warning message data. This has the advantage that a more accurate determination of a relevance of the hazard is achieved by taking the sensor data into account.

According to one further specific embodiment of the present invention, the warning message data have additional classification data from which a type of hazard is inferred. This is advantageous, since a simple indication of the type of hazard on the basis of the classification data shows the type of hazard for which the relevance is to be determined on the basis of sensor data. This makes it possible to advantageously use specific sensor data as a function of the type of hazard, or specific sensor data which are not important for checking the relevance of a hazard in a specific type of hazard may be excluded.

According to one further specific embodiment of the present invention, the safety measures are selected as a function of the type of hazard. This is advantageous, since those safety measures which increase the safety of the vehicle occupants during a specific type of hazard are selected thereby.

According to one further specific embodiment of the present invention, it is determined, as a function of the relevance, whether a safety measure is taken which includes activation of an actuator in the vehicle. This is advantageous, since a check of this type as to whether such a safety measure is to be taken may be used to determine whether such safety measures are necessary as early as the time that the relevance is examined.

According to one further specific embodiment of the present invention, the safety measures are selected using the classification data and using selection data provided by a memory unit. This is advantageous, since an automatic selection of the safety measures on the basis of qualification data and selection data, preferably tables, makes it possible to extract the safety measures from the selection data without having to transmit them to the vehicle via data transmission.

According to one further specific embodiment of the present invention, the safety measures are selected using received measure data. This is advantageous, since transmitting measure data, preferably data to be displayed on a display unit, makes it possible to take safety measures which relate to data from a central office or a coordinating point.

According to one further example embodiment, a control unit is provided for selecting safety measures to be taken to increase the safety of occupants of a vehicle with regard to a hazard due to environmental influences. The control unit has a first interface for receiving warning message data as well as a second interface for receiving position data of the vehicle. The control unit furthermore has an arithmetic unit which infers the relevance of the hazard of the vehicle from the position data and the warning message data. The control unit is characterized in that the arithmetic unit takes at least one of the safety measures as a function of the relevance in such a way that the arithmetic unit activates an actuator via a third interface. The control unit has the advantage that, due to the fact that the arithmetic unit activates an actuator as a function of the relevance of the hazard, the control unit takes those measures which increase the safety of the occupants of the vehicle by changing the states of sub-devices of a vehicle.

According to one further specific embodiment, the control unit has a fourth interface to at least one sensor unit of the vehicle. The arithmetic unit thereby infers the relevance of the hazard from sensor data provided by the at least one sensor unit in addition to the position data and the warning message data. This is advantageous, since the control unit may thus determine the relevance of the hazard more reliably and more accurately by taking the provided sensor data into account.

According to one further specific embodiment of the present invention, the arithmetic unit infers a type of hazard from classification data included in the warning message data. This is advantageous, since the arithmetic unit may automatically infer the type of hazard from the classification data in a particularly easy way.

DETAILED DESCRIPTION OF THE INVENTION

The method according to the present invention is directed to a selection of safety measures to be taken to increase the safety of occupants of a vehicle with regard to a hazard due to environmental influences. A hazard due to environmental influences in this context may be, for example, a hurricane, a tropical cyclone, a fire, a forest fire, an earthquake, a tsunami, a hail storm, a flood, a storm surge, an avalanche, a toxic gas cloud, or similar hazards due to the environment. According to the present invention, position data and warning message data are used to infer a relevance of the hazard for the vehicle or the vehicle occupants. The position data are received, for example, from GPS satellites or similar radio transmission units. The warning message data are received, for example, from a central office via wireless data communications. For example, transmission methods based on satellites, the GSM network, the UMTS network, or other wireless transmission networks are suitable for wireless data communications. The warning message data preferably include data with regard to a position of a hazard, for example a position of a toxic gas cloud, or data about an area in which the hazard is present. By comparing warning message data with the position data of the vehicle, warning message data of this type may be used to infer the relevance of the hazard in such a way that it is determined whether a hazard to the vehicle exists. According to the present invention, at least one of the safety measures is selected and taken as a function of the relevance, this safety measure including activation of an actuator in the vehicle. For example, if a vehicle approaches a toxic gas cloud whose position or spread was transmitted to the vehicle or to a communication unit via warning message data, for example the closing of the vehicle windows by electric window lifts in the vehicle, may be triggered as the activation of an actuator. A further measure as an activation of an actuator is, for example, to activate the vehicle's ventilation system or air conditioning system, which is set to internal air circulation.

Figure 1:
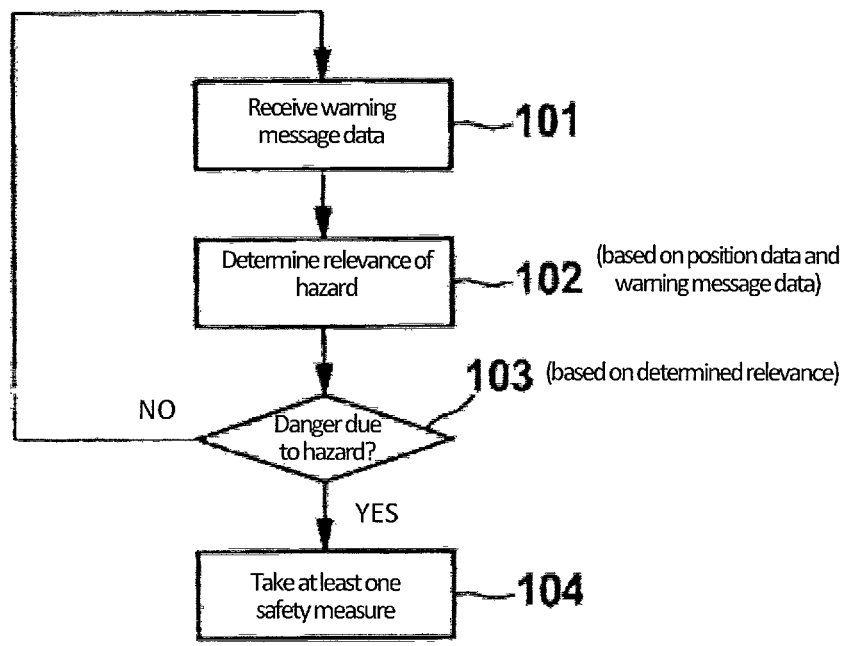
FIG. 1 shows a flow chart of the method according to the present invention.

For this purpose, FIG. 1 shows a flow chart of the method according to the present invention. A first method step 101 involves waiting until warning message data are received. After the warning message data have been received, the method moves from first method step 101 to second method step 102. In second method step 102, a relevance of the hazard to the vehicle or vehicle occupants is inferred from received position data and the received warning message data. For example, it may be determined whether a vehicle is located in an area in which a hazard due to environmental influences is present. After determining the relevance, the method moves from second method step 102 to third method step 103, the flow chart branching in third method step 103 to different, additional method steps as a function of the relevance. If the check of the relevance has shown that the vehicle or the vehicle occupants are not endangered by a hazard due to environmental influences, because for example the vehicle is in a non-hazardous area, the method branches from third method step 103 back to first method step 101. In first method step 101, the method again waits until warning message data are received. In the event that the method is located in third method step 103 and, in addition, a relevance check shows the presence of a serious hazard, the method branches from third method step 103 to fourth method step 104. In this fourth method step 104, at least one safety measure is taken which includes an activation of an actuator in the vehicle.

Preferably, the relevance of the hazard is additionally determined by the fact that sensor data provided by at least one sensor unit of the vehicle are used. In the event of a hazard due to a toxic gas cloud, for example, sensors for measuring the oxygen concentration or the concentration of other gases in the ambient air may provide sensor data from which it may be inferred whether an actuator must be activated, for example in the form of an electric window lift to close the vehicle window. Taking sensor data of a sensor unit into account in this way also takes place in second method step 102.

Further sensors which may be used to determine a relevance of a hazard are preferably pressure sensors and/or temperature sensors. This makes it possible, for example, to detect sudden changes in the weather pattern.

In addition, the warning message data also have classification data from which a type of hazard is inferred. The safety measures are thus preferably selected as a function of the type of hazard. The classification data may be, for example, data which display different classes of hazards. A first hazard class may be, for example, a strong movement of air masses. These may be, for example, a hurricane, a tornado, a tropical cyclone, or a severe storm. A further hazard class may be, for example, a fire hazard in the form of a wildfire, a forest fire, or a fire involving industrial buildings. Another hazard class may be, for example, a shifting of earth masses, for example an earthquake. A further hazard class may be, for example, a hazard due to water masses in the form of a tsunami, a flash flood, a storm surge, or another form of flooding. A further hazard class may be provided, for example, by snow masses, preferably by an avalanche. Another hazard class may be, for example, an environmental disaster in the form of toxic gases or a radioactive cloud.

Figure 2:
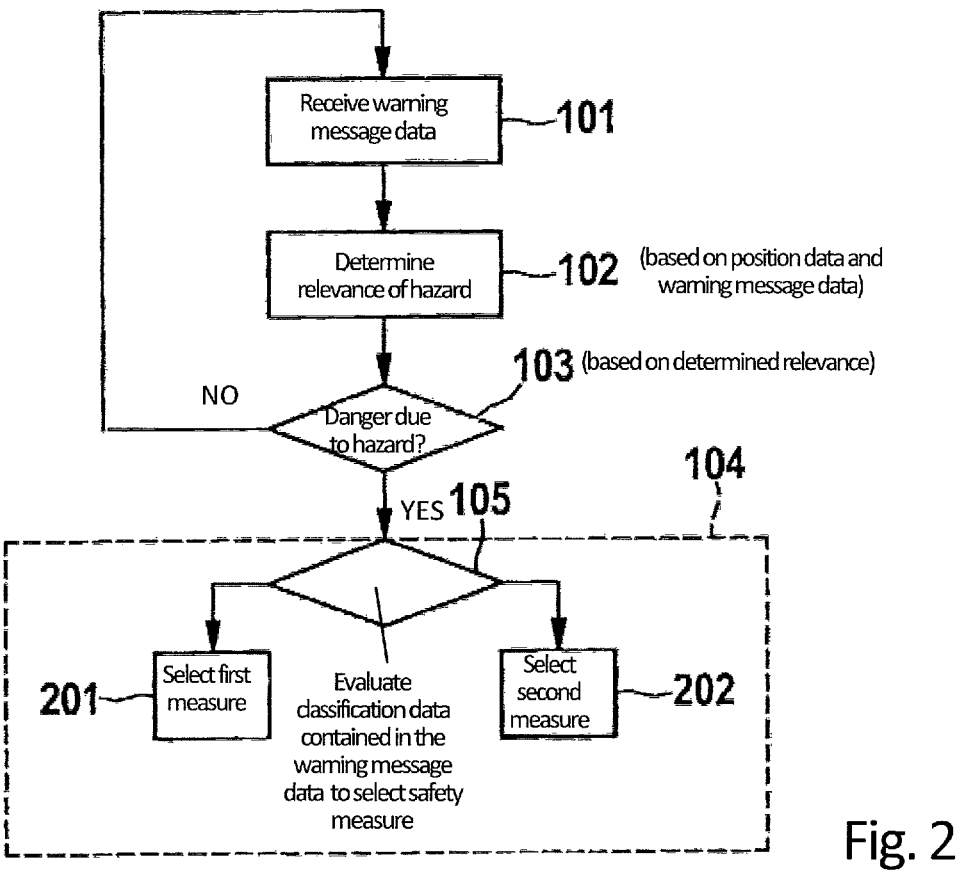
FIGS. 2 and 3 show further specific embodiments of the method.

FIG. 2 provides a flow chart for this purpose. The flow chart in FIG. 2 includes all elements which are included in FIG. 1, using the same reference numerals. In addition, fourth method step 104 is specified in greater detail in FIG. 2. This fourth method step 104 has a fifth method step 105, in which the classification data are evaluated in such a way that either a first measure 202 or a second measure 202 is selected as a function of the type of hazard. Thus, if the existing type of hazard is displayed on the basis of the classification data, it is possible to particularly easily determine therefrom in fifth method step 105 which type of safety measure in the given type of hazard will increase the safety of the vehicle or the vehicle occupants.

According to one further specific embodiment of the present invention, it is determined, as a function of the relevance of the hazard, whether one of the safety measures is to be taken which includes activation of an actuator in the vehicle.

It is possible to determine, for example, whether a simple output of safety information via a display unit is sufficient, so that a driver may increase the safety of the vehicle by driving the vehicle in an appropriate manner, or whether the actuator does indeed need to be activated. This results in a two-stage method in which only information is output in a first stage, and in another, second stage in which both information or warning messages are output and actuators in the vehicle are activated. Thus, the second stage is selected if it is inferred as a function of the relevance of the hazard that it is necessary to activate an actuator.

The safety measures are preferably selected from selection data provided by a memory unit, using the classification data. For example, warning information to be displayed or tables of safety measures may be previously stored in a memory unit to activate actuators for specific classes of hazards. The information to be output thus does not necessarily have to be transmitted and received by radio transmission, but may be read directly out of the memory unit as a function of the classification data. Likewise, safety measures which are defined in the selection data for a particular class of hazard may be immediately selected and taken on the basis of the selection data upon evaluating the classification data.

Figure 3:
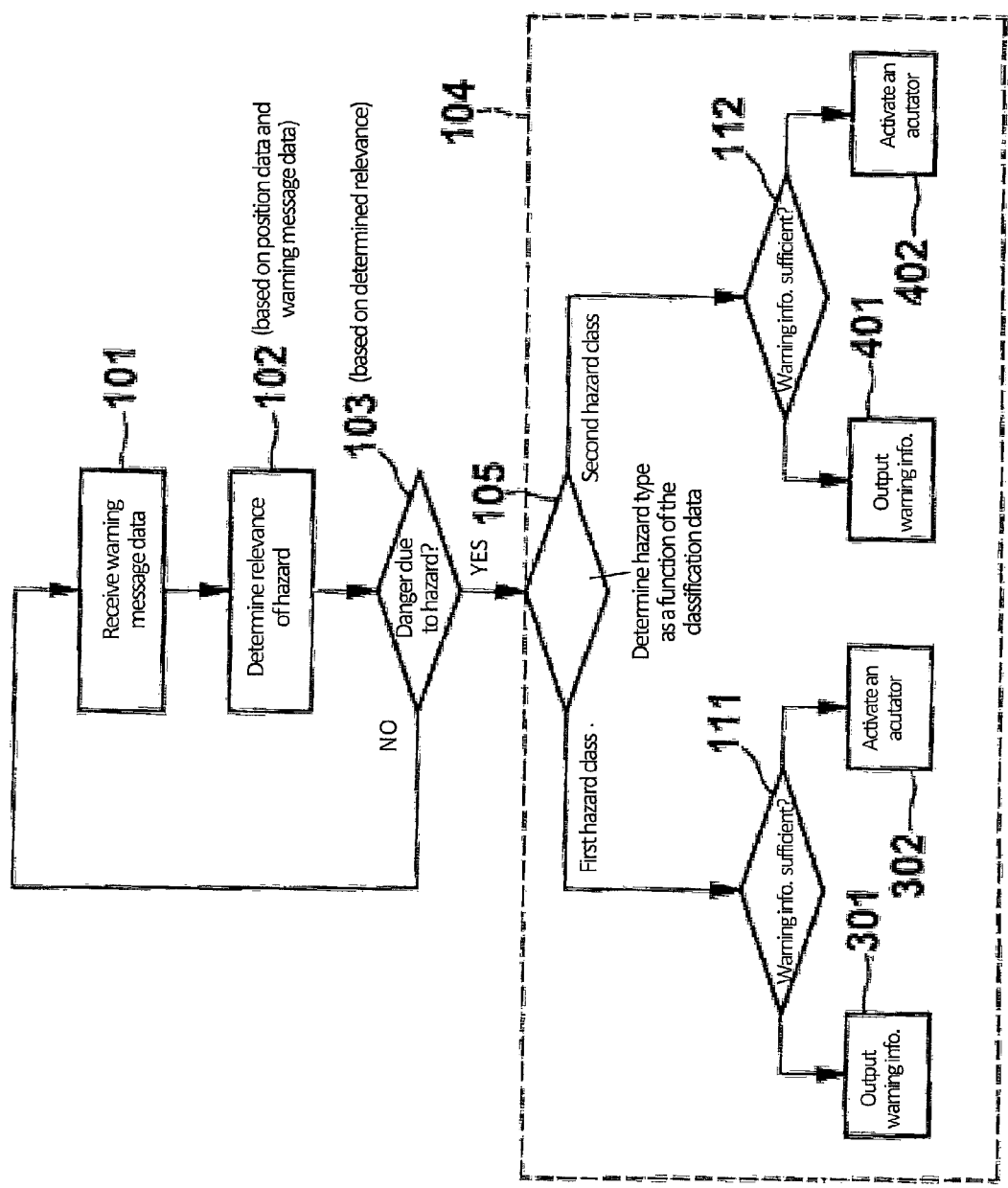

FIG. 3 shows an exemplary embodiment of the method according to the present invention, using a two-stage warning concept. FIG. 3 includes all elements of the flow chart in FIG. 1, using the same reference numerals. In addition, fourth method step 104 is specified in greater detail in FIG. 3. Fourth method step 104 has fifth method step 105, in which the type of hazard is inferred as a function of the classification data. The method branches from the fifth method step either to a first stage decision 111 for a first class of hazard or to a second stage decision 112 for a second class of hazard as a function of the type of hazard. Depending on the class of hazard to be taken into account, a particular stage decision must be provided. According to the exemplary embodiment in FIG. 3, it is possible to distinguish between two classes of hazard. In the first stage decision, it is determined for the first type of hazard, as a function of the hazard relevance, whether the method branches either to a first measure step 301 or to a second measure step 302. The method branches to first measure step 301 if an output of warning information to the driver is sufficient. Thus, warning information alone is output to the driver in first measure step 301. However, if it is determined in first stage decision 111 that it is necessary to take safety measures which include activating an actuator in the vehicle, the method branches from first stage decision 111 to second measure step 302. Second measure step 302 includes either only an activation of an actuator in the vehicle or additionally an output of warning messages. If it was determined in fifth method step 105 that a second class of hazard is present, the method branches to second stage decision 112. In second stage decision 112, the relevance of the hazard in the second hazard class is used to decide whether to branch to a third measure step 401 or to a fourth measure step 402. If it is determined on the basis of the specific relevance of the hazard that a simple output of warning information is sufficient, the method branches to third measure step 401. If it is determined in second stage decision 112 that safety measures in which actuators in the vehicle are activated need to be taken on the basis of the relevance of the hazard, the method branches to fourth measure step 402. The safety measures are preferably selected using received measure data. The received measure data may be, for example, warning information or instructions to a driver which are issued from a coordination center. Based on the measure data, a coordination center or a disaster center may thereby specify, on the basis of the measure data, which type of information or warning instructions are transmitted to the vehicle and result in a specific type of warning messages or information.

Different classes of hazards having corresponding safety measures, which include activations of actuators, are listed below:

In the event of a hazard due to a hurricane, a tornado, a tropical cyclone, or a severe storm, sensor data of sensor units in the form of yaw rate sensors or low-g acceleration sensors may preferably be used. This makes it possible to monitor whether vehicle swaying occurs. It is also possible to use sensor units in the form of video sensors, so that a presence of the hazard may be determined by image recognition. Warning information which is output via display units or in another form may be, for example, driving instructions to the driver advising the driver to drive as slowly as possible or to stop the vehicle. Other forms of warning information are possible. As a form of actuation of actuators for hazards of this type, for example the rollover protection or rollover bar in convertibles, is activated to keep objects falling on the vehicle away from the vehicle occupants. A further activation of an actuator may be, for example, a deactivation of the central locking system to enable rescue crews to open the doors to rescue vehicle occupants.

In the event of a class of hazard due to fire danger, for example a wildfire or a forest fire, sensors may be used, for example, to determine whether the carbon dioxide concentration in the ambient air is exceeding a critical value. Activating an actuator in this case may be, for example, switching the air conditioning system or the ventilation system to internal air circulation for the purpose of preventing gases from entering the vehicle.

In the event of a hazard due to an earthquake as a further class of hazard, it is possible to determine whether the vehicle is subject to certain rocking motions, for example using motion or acceleration sensors. Activating actuators in this case may preferably involve closing the windows, closing a convertible roof, positioning a roll bar, or actuating automatic headrests.

In the event of a hail warning, activating an actuator may involve, for example, automatically closing the roof and the windows.

In the event of a class of hazard due to toxic gases or radioactive air masses, activating actuators may preferably involve automatically closing a roof or windows or also switching the air conditioning system to internal air circulation.

Further specific embodiments of the present invention by combining aforementioned specific embodiments are also possible to achieve further advantages.

If one specific embodiment of the method according to the present invention determines that a relevance of the hazard to the vehicle is such that actuators in the vehicle should be activated, data may be transmitted from the vehicle to other vehicles or to a central office, preferably following the activation of the actuators, the transmitted data including a warning, an indication of the hazard, and/or a position of the vehicle.

Figure 4:
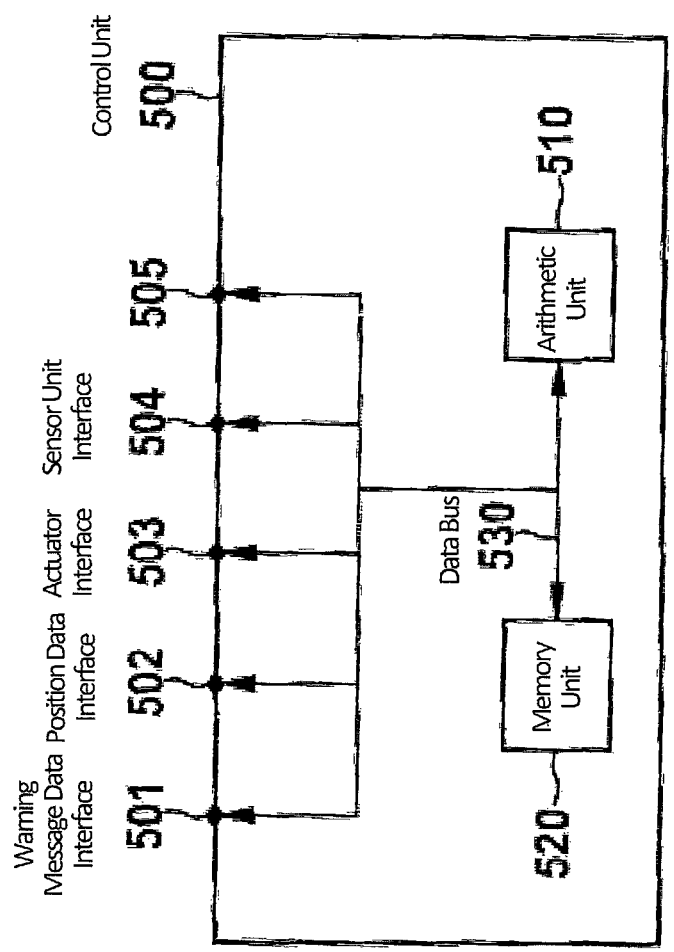
FIG. 4 shows a specific embodiment of a control unit according to the present invention.

FIG. 4 shows a control unit according to the present invention for selecting safety measures to be taken to increase the safety of occupants of a vehicle. Control unit 500 has a first interface 501 for receiving warning message data as well as a second interface 502 for receiving position data of the vehicle. Control unit 500 furthermore has an arithmetic unit 510 which infers a relevance of the hazard to the vehicle from the received position data and the received warning message data. Interfaces 501, 502 and arithmetic unit 510 are preferably connected to each other via a data bus system 530, for example via an internal data bus of a computer system. The control unit according to the present invention is characterized in that arithmetic unit 510 implements at least one of the safety measures as a function of the relevance in such a way that the arithmetic unit activates an actuator via a third interface 503. In this case, third interface 503 is also preferably connected to internal bus system 530 of control unit 500. According to one further specific embodiment of the present invention, control unit 500 has a fourth interface 504, via which control unit 500 is connected to at least one sensor unit. Arithmetic unit 510 infers the relevance of the hazard from sensor data provided by the at least one sensor unit in addition to the position data and the warning message data.

Arithmetic unit 510 preferably infers a type of hazard from the classification data included in the warning message data. Control unit 500 preferably also has a memory unit 520, in which safety measures are preferably stored and may be retrieved by arithmetic unit 510. Furthermore, data are preferably stored in memory unit 520, on the basis of which it may be determined which type of measures are to be taken for which type/class of hazard, using the classification data.

What is claimed is:

1. A method for selecting at least one safety measure to be taken to provide safety of occupants of a vehicle in response to a hazard due to environmental influences, comprising:
receiving position data of the vehicle;
receiving warning message data that identifies a position of the hazard due to environmental influences;
determining a type of the hazard based on classification data included in the warning message data, the classification data describing the type of the hazard according to one of a plurality of predefined hazard categories;

determining in the vehicle a relevance of the hazard to the vehicle based on a comparison between the position of the hazard and the received position data of the vehicle and further based on the received warning message data;

determining the relevance of the hazard based additionally on sensor data provided by at least one sensor unit among a plurality of sensor units in the vehicle that provide data relevant to different ones of the plurality of predefined hazard categories, the sensor data of the at least one sensor unit being relevant to the specific type of hazard described by the classification data; and selecting and triggering at least one of multiple available safety measures as a function of the determined relevance of the hazard when the relevance, as determined based on both the comparison and the sensor data, indicates that there is a danger to the vehicle or a vehicle occupant, wherein the multiple available safety measures include at least one measure involving activation of an actuator in the vehicle;

wherein at least one of following is selected, as a function of the type of the hazard, as the at least one safety measure:
closing the vehicle's windows;
positioning a rollover bar;
closing a vehicle roof; and
switching an air conditioning system or ventilation system to internal air circulation mode.

2. The method as recited in claim 1, wherein the selecting and triggering at least one safety feature includes determining as a function of the relevance of the hazard whether at least one safety measure involving activation of an actuator in the vehicle is selected.

3. The method as recited in claim 2, wherein the at least one safety measure is selected using selection data provided by a memory unit, wherein the selection data defines safety measures that vary depending on the type of hazard.

4. The method as recited in claim 2, wherein the at least one safety measure is selected using received measured data that is transmitted from a remote office and includes warning information for display to the driver.

5. The method as recited in claim 1, wherein the predefined hazard categories include strong moving air masses, fire hazards, shifting earth masses, water masses, snow masses and environmental disasters.

6. The method as recited in claim 1, wherein the at least one safety measure is selected to prevent gases from entering the vehicle.

7. The method as recited in claim 1, wherein the at least one safety measure is selected to keep a falling object away from a vehicle occupant.

8. The method as recited in claim 1, wherein the at least one safety measure is selected to protect a vehicle occupant from rocking motions caused by the hazard.

9. A control unit for selecting at least one safety measure to be taken to provide safety of occupants of a vehicle in response to a hazard due to environmental influences, comprising:

a first interface configured to receive warning message data that identifies a position of the hazard due to environmental influences;

a second interface configured to receive position data of the vehicle;

a third interface configured to interact with at least one actuator;

a fourth interface configured to interface with a plurality of sensor units of the vehicle, the sensor units providing data relevant to different ones of a plurality of predefined hazard categories; and an arithmetic unit configured to:
determine a type of the hazard based on classification data included in the warning message data, the classification data describing the type of the hazard according to one of the predefined hazard categories;

determine a relevance of the hazard to the vehicle based on a comparison between the position of the hazard and the received position data of the vehicle and further based on the received warning message data;

determine the relevance of the hazard based additionally on sensor data provided by at least one sensor unit among the sensor units, the sensor data of the at least one sensor unit being relevant to the specific type of hazard described by the classification data; and select and trigger at least one of multiple available safety measures as a function of the determined relevance of the hazard when the relevance, as determined based on both the comparison and the sensor data, indicates that there is a danger to the vehicle or a vehicle occupant, in such a way that an actuator is activated via the third interface;

wherein the arithmetic unit selects, as a function of the type of the hazard, at least one of following as the at least one safety measure:
closing the vehicle's windows;
positioning a rollover bar;
closing a vehicle roof; and
switching an air conditioning system or ventilation system to internal air circulation mode.

10. The control unit as recited in claim 9, wherein the predefined hazard categories include strong moving air masses, fire hazards, shifting earth masses, water masses, snow masses and environmental disasters.

11. The control unit as recited in claim 9, wherein the arithmetic unit selects the at least one safety measure to prevent gases from entering the vehicle.

12. The control unit as recited in claim 9, wherein the arithmetic unit selects the at least one safety measure to keep a falling object away from a vehicle occupant.

13. The control unit as recited in claim 9, wherein the arithmetic unit selects the at least one safety measure to protect a vehicle occupant from rocking motions caused by the hazard.

* * * * *